United States Patent [19]

Yamada

[11] Patent Number: 5,126,757
[45] Date of Patent: Jun. 30, 1992

[54] MULTI-GRADATION IMAGE RECORDING APPARATUS

[75] Inventor: Keiki Yamada, Kanagawa, Japan

[73] Assignee: Mitsubishi Denki Kabushiki Kaisha, Japan

[21] Appl. No.: 685,271

[22] Filed: Apr. 15, 1991

[30] Foreign Application Priority Data

Apr. 19, 1990 [JP] Japan .................................. 2-105552
Sep. 27, 1990 [JP] Japan .................................. 2-257971
Feb. 19, 1991 [JP] Japan .................................. 3-24535

[51] Int. Cl.⁵ ........................ H04N 1/23; G01D 15/10
[52] U.S. Cl. ................................ 346/76 PH; 358/298
[58] Field of Search ............... 346/76 PH; 358/298; 400/120

[56] References Cited

U.S. PATENT DOCUMENTS 4,821,111  4/1989  Nowell ........................... 346/76 PH
4,843,408  6/1989  Tanaka ........................... 346/76 PH
5,038,208  6/1991  Ichikawa et al. .................. 358/75 IJ Primary Examiner—Benjamin R. Fuller
Assistant Examiner—Huan Tran
Attorney, Agent, or Firm—Leydig, Voit & Mayer

[57] ABSTRACT

A multi-gradation recording apparatus whose circuits are simplified by reducing the number of recording gradation level bits specified to each recording element without reducing the recording resolution and whose idle time in which no recording is performed to the thermal head is shortened to increase its recording speed.

10 Claims, 12 Drawing Sheets

FIG. 7

| INPUT GRADATION LEVEL | CORRECTION DATA | | | | | | | | | |
|---|---|---|---|---|---|---|---|---|---|---|
| | 0.9 | 0.91 | 0.92 | 0.93 | 0.94 | 1.06 | 1.07 | 1.08 | 1.09 | 1.1 |
| 0 | 0 | 0 | 0 | 0 | 0 | 0 | 0 | 0 | 0 | 0 |
| 1 | 1 | 1 | 1 | 1 | 1 | 1 | 1 | 1 | 1 | 1 |
| 2 | 2 | 2 | 2 | 2 | 2 | 2 | 2 | 2 | 2 | 2 |
| 3 | 3 | 3 | 3 | 3 | 3 | 3 | 3 | 3 | 3 | 3 |
| 4 | 4 | 4 | 4 | 4 | 4 | 4 | 4 | 4 | 4 | 4 |
| 5 | 5 | 5 | 5 | 5 | 5 | 5 | 5 | 5 | 5 | 5 |
| ⁘ | ⁘ | ⁘ | ⁘ | ⁘ | ⁘ | ⁘ | ⁘ | ⁘ | ⁘ | ⁘ |
| 120 | 108 | 109 | 110 | 112 | 113 | 127 | 128 | 130 | 131 | 132 |
| 121 | 109 | 111 | 111 | 112 | 114 | 128 | 129 | 131 | 132 | 133 |
| 122 | 110 | 111 | 112 | 113 | 115 | 129 | 131 | 132 | 133 | 134 |
| ⁝ | | | | | | | | | | |
| 255 | 230 | 232 | 235 | 237 | 240 | 270 | 273 | 275 | 278 | 280 |

FIG. 9A

| 0 | 1 | 2 | 3 | 4 | 5 | 6 | ... | 254 | 255 | ... | 278 | 279 | 280 |

FIG. 9B

| 0 0 / 0 0 | 0 0 / 1 0 | 1 0 / 0 1 | 1 1 / 0 1 | 1 1 / 1 1 | 1 1 / 2 1 | 2 1 / 1 2 | ... |
|---|---|---|---|---|---|---|---|
| 0 | 1 | 2 | 3 | 4 | 5 | 6 | |

| 64 63 / 63 64 | 64 64 / 63 64 | ... | 70 69 / 69 70 | 70 70 / 69 70 | 70 70 / 70 70 |
|---|---|---|---|---|---|
| 254 | 255 | | 278 | 279 | 280 GRADATION |

FIG. 9C

|  | ODD PIXEL | EVEN PIXEL |
|---|---|---|
| ODD LINE | 272 | 277 |
| EVEN LINE | 278 | 280 |

↑

|  | ODD PIXEL | EVEN PIXEL |
|---|---|---|
| ODD LINE | 68 | 69 |
| EVEN LINE | 69 | 70 |

CORRECTION GRADATION LEVEL

| | RECORDING LINE DATA | | | |
|---|---|---|---|---|
| | ODD LINE ('1') | | EVEN LINE ('0') | |
| | RECORDING ELEMENT POSITION DATA | | | |
| | ODD PIXEL ('1') | EVEN PIXEL ('0') | ODD PIXEL ('1') | EVEN PIXEL ('0') |
| 0 | 0 | 0 | 0 | 0 |
| 1 | 1 | 0 | 0 | 0 |
| 2 | 1 | 0 | 0 | 1 |
| 3 | 1 | 1 | 0 | 1 |
| 4 | 1 | 1 | 1 | 1 |
| 5 | 2 | 1 | 1 | 1 |
| 6 | 2 | 1 | 1 | 2 |
| 7 | 2 | 2 | 1 | 2 |
| 8 | 2 | 2 | 2 | 2 |
| 9 | 3 | 2 | 2 | 2 |
| ⋮ | | | | |
| 276 | 69 | 69 | 69 | 69 |
| 277 | 70 | 69 | 69 | 69 |
| 278 | 70 | 69 | 69 | 70 |
| 279 | 70 | 70 | 69 | 70 |
| 280 | 70 | 70 | 70 | 70 |
| | A | B | C | D |

FIG. 13

| POSITION OF RECORDING ELEMENT \ COLOR SIGNAL | Y (00) | M (01) | C (10) | Bk (11) |
|---|---|---|---|---|
| 1 | 0.90 | 0.91 | 0.92 | 0.93 |
| 2 | 1.10 | 1.09 | 1.08 | 1.07 |
| 3 | 0.96 | 0.96 | 0.95 | 0.94 |
| 4 | 1.00 | 1.00 | 0.99 | 0.99 |
| 5 | 1.00 | 1.00 | 0.99 | 0.99 |
| 6 | 0.99 | 0.99 | 0.98 | 0.98 |
| 7 | 0.98 | 0.97 | 0.97 | 0.96 |
| 8 | 0.97 | 0.97 | 0.96 | 0.96 |
| 1280 | 1.00 | 1.00 | 0.99 | 0.99 |

MULTI-GRADATION IMAGE RECORDING APPARATUS

BACKGROUND OF THE INVENTION

The invention relates to a multi-gradation image recording apparatus to be applied to such recording apparatuses as printers, copying machines, and facsimile machines, and more particularly to a recording apparatus capable of producing high-quality multi-gradation images.

Among a variety of multi-gradation image recording apparatuses, a thermosensitive recording apparatus and a thermal transfer recording apparatus, being relatively simple in their structure, are extensively applied to various recording systems such as printers, copying machines, and facsimile machines.

To record multi-gradation images, a thermal transfer recording method using, e.g., sublimated ink sheets is employed. In this method, an amount of color ink, which corresponds to an amount of heat generated by electric energy applied to a plurality of heating resistors constituting a recording thermal head, is transferred onto a recording sheet to record the images. The amount of heat generated by the heating resistors is controlled by the number and duration of electric pulses applied to these resistors.

This thermal transfer recording method allows comparatively satisfactory multi-gradation recording to be achieved with a simple control.

Such a conventional multi-gradation recording system is disclosed in, e.g., Japanese Patent Unexamined Publication No. Sho-60-9271/(1985). FIG. 15 is a chart showing waveforms of conducting pulse SB to be applied to the respective heating resistors constituting the thermal head in this conventional multi-gradation recording system, where $t_w$ is the pulse duration of the conducting pulse SB, $t_p$ is the repetitive cycle of the conducting pulse SB, and N is the number of conducting pulses SB (3 in this example). The number of conducting pulses SB is selected and set in advance on a density basis, each density being expressed in a gradation level. By applying such number of conducting pulses SB as specified every gradation level, a portion of ink commensurate with the energy corresponding to the number of pulses is sublimated, thereby causing an image to be recorded at respective gradation levels. In the recording, usually, the conducting pulses are applied to the corresponding heating resistors arranged in line on the thermal head either collectively or in division. The recording of a plurality of lines is performed while forwarding a recording sheet in an auxiliary scanning direction at a constant speed sequentially.

The multi-gradation recording is performed as described above. Since a major factor defining the recording density of each gradation level is the temperature of each heating resistor disposed on the thermal head, variations in resistance of the heating resistors and variations in temperature due to change in ambient temperature or the like greatly affect the recording density, and this makes it difficult to implement high-quality recording. To overcome such a shortcoming, various correction means have been proposed.

To deal with changes in ambient temperature, a thermistor (temperature-sensitive element) is employed. The thermistor mounted on the thermal head detects changes in temperature so that the duration or number of pulses specified every gradation level are controlled. Therefore, the variations in the recording density of the same gradation level can be suppressed.

To correct density nonuniformity due to variations in resistance of the heating resistors, a measure has been reported in a thesis entitled "Development of a High-Definition Video Copy" (No. 1276 of Preliminary Publications of the Convention of the 1986 Electronic Information Communications Society). Specifically, FIG. 16 is a block diagram showing a means for correcting erratic resistances. In FIG. 16, reference numeral 101 designates a counter for counting a clock; 102, an EPROM (erasable programmable read only memory) which receives count data from the counter 101 as an address and outputs data (a correction constant number specified for each heating resistor) for the address; 103, an EPROM which receives the data from the EPROM 102 and 6-bit signals C (cyan=blue), M (magenta=red), and Y (yellow) as an address and outputs data (6-bit resistance-corrected C, M, Y signals). Its operation comprises the steps of measuring the resistances of respective heating resistors in advance, grouping the heating resistors by the resistance, causing the EPROM 102 to store data concerning which heating resistor selects which correction constant as a number table by the counter 101, and converting the magnitude of the C, M, Y signals at the EPROM 103 that references to each group number of a correction constant. More specifically, an output signal selected from 0 to 63 levels is generated from an input signal indicating any of 0 to 63 levels in accordance with an error in the resistance of a heating resistor. For example, a 38-level signal corresponding to a 100th heating resistor is recorded after being corrected to a 40-level or 35-level signal. However, such correction is not effective in eliminating density nonuniformity at a high-density side, thereby not allowing high-quality recording comparable to photographs to be achieved. To overcome the problem of density nonuniformity, the measure of converting the magnitude of a gradation level signal is taken in the above example. However, if a gradation level signal to be applied to a heating resistor is, e.g., level 63 and if it is the upper limit in the gradation level scale, then, the corrected level is level 70, such corrected level cannot exhibit its proper value in the recording, and the recording is effected at level 63 instead. As a result, the correction accuracy is impaired, and this imposes the problem of deteriorating the image quality. What has been achieved is only "compressed recording" such as 50-level recording out of 64-level recording (see FIG. 17).

By the way, in such a multi-gradation recording apparatus, if an input signal applied to the thermal head has n gradation, then the maximum drive count to be applied to the thermal head is made coincide therewith. And even though the thermal head is replaced, such maximum drive count has been fixed to n. Further, each gradation level of any of the recording colors Y, M, C, BK has been subjected to the same correction as described above.

The conventional multi-gradation recording apparatus is disadvantageous as follow.

First, the conventional multi-gradation recording system could not correct density nonuniformity at a high-density portion. For example, even if an input signal has 64 gradation levels, the recorded images are compressed to 50 gradations. Therefore, high-quality recording, such as photograph, could not be achieved.

Second, in the conventional multi-gradation recording apparatus, the maximum drive count applied to the thermal head is maintained constant at all times (e.g., a fixed 280-level drive). If the resistance of the heating resistors of the thermal head has been improved and, as a result, the head has been replaced (the maximum output signal of the correction means is converted to level 260). then 20 unrecorded drive signals (280−260=20) are applied, hence producing an idle time.

Third, in the conventional multi-gradation recording apparatus, the density nonuniformity correction means receives no signal corresponding to a color signal. Thus, recording color-based density nonuniformity cannot be corrected completely and thus high-quality recording comparable to photographs cannot be implemented. Specifically, as shown in FIGS. 3A to 3D, a relation between the energy to be applied to the thermal head (the number of conducting pulses) per color and the recording density cannot be expressed as a linear function since the low and high density portions have gradual inclinations. To overcome this circumstances, a recording density is segmented uniformly. For example, as shown in FIG. 3A, for signal Y, the number of pulses are defined in advance in such a manner that: level 1 is set to 10 pulses; level 2, to 16 pulses; . . . ; and level 64, to 250 pulses (in 64-level recording) so that densities of respective gradation levels can be reproduced properly. Such correspondence is prepared every recording color Y, M, C, or Bk if necessary. That is, the number of pulses (energy) for a gradation level differs from one color to another, and if density nonuniformity is corrected independently of recording colors as in the case of the conventional example, then some colors remain uncorrected as shown in FIG. 4 (colors Y, M, Bk in FIG. 4), thereby impairing the image quality in systems in which colors are recorded while overlapping three or four colors one upon the other. In short, the conventional example is only suitable for use in monochrome recording and thus it is far from being qualified as a high-quality recording apparatus.

SUMMARY OF THE INVENTION

The invention has been made in view of the above circumstances. Accordingly an object of the invention is to provide a multi-gradation recording apparatus whose circuits are simplified by reducing the number of recording gradation level bits specified to each recording element without reducing the recording resolution and whose idle time in which no recording is performed to the thermal head is shortened to increase its recording speed.

A first aspect of the invention is applied to a multi-gradation recording apparatus, which includes correction means for density nonuniformity. This correction means is effective also to a high-density portion which includes greater part of gradation levels in the scale of gradation levels, and corrects an n-level input to an (n+m)-level output so that recording of the pixels can be effected at an (n+m) level.

A second aspect of the invention is applied to a multi-gradation recording apparatus which corrects an n-level input to an (n+m)-level output to correct density nonuniformity caused by erratic recording element outputs or the like, and such (n+m) level is combined with position data of k pixels to provide the recording elements corresponding to the k pixels with a set of coarse gradation levels which are substantially (n+m)/l, so that the k pixels are recorded by the corresponding k recording elements at the coarse gradation levels.

A third aspect of the invention is applied to a multi-gradation recording apparatus which provides a recording element of recording means with a drive count proportional to an input gradation level by allowing a maximum drive count to be set variably so that, when the recording means is replaced and, as a result, an input signal indicating a maximum gradation level is changed, a maximum drive count of the replaced recording means can be accommodated.

A fourth aspect of the invention is applied to a multi-gradation recording apparatus which applies color signals indicating such recording colors as Y, M, and C, or Y, M, C, and Bk to correction means 2 or correction data storage means 12, so that an output signal can be corrected by the color.

The multi-gradation recording apparatus according to the first aspect of the invention not only allows the number of bits of an (n+m) level signal, which is a corrected output, to be larger than the number of bits of an input signal so that gradation levels at a high-density side can also be corrected properly.

The multi-gradation recording apparatus according to the second aspect of the invention additionally uses position data of a plurality of pixels and provides recording elements with gradation level signals, each of which consists of such a reduced number of bits as corresponding to a maximum (n+m)/l gradation level even with respect to an (n+m)-level input signal whose number of bits has become larger than that of an original input signal by density nonuniformity correction.

The multi-gradation recording apparatus according to the third aspect of the invention defines the maximum drive count for driving the recording elements in accordance with a maximum gradation level input.

The multi-gradation recording apparatus according to the fourth aspect of the invention defines the output of the correction means 2 or the correction data storage means 12 based on a color signal.

BRIEF DESCRIPTION OF THE DRAWINGS

FIG. 7 is a diagram showing a table for preparing an output corrected gradation level from both a correction data of a recording element and an input gradation level; FIGS. 9A to 9C are diagrams for a description of the construction and density of pixels; FIG. 13 is a diagram showing an exemplary content of a correction data storage means 12.

DESCRIPTION OF PREFERRED EMBODIMENTS

Figure 1:
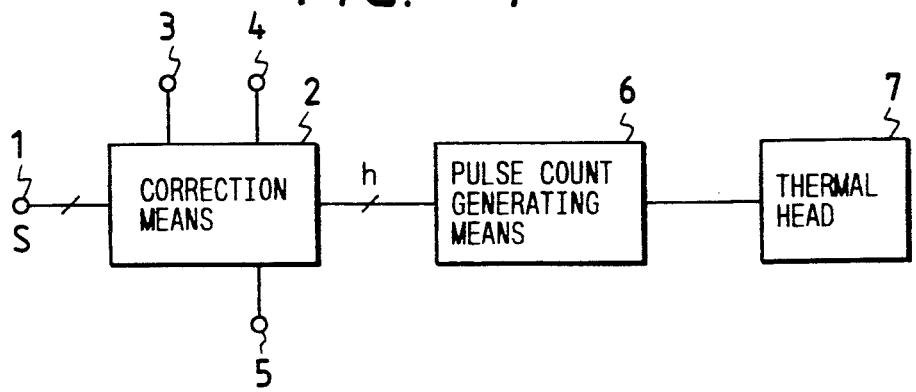
FIG. 1 is a block diagram showing a multi-gradation recording apparatus, which is an embodiment of the invention.
Figure 5:
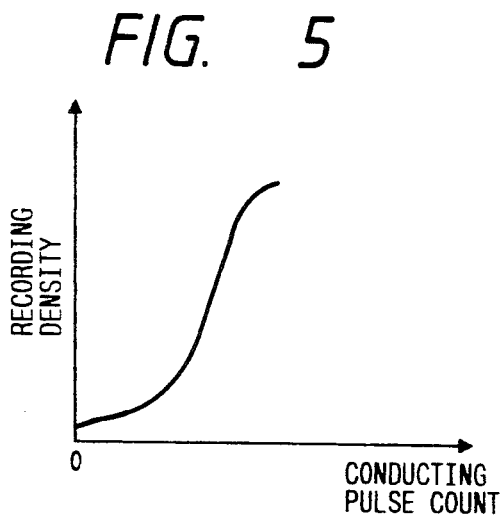
FIG. 5 is a diagram showing a correlation between the conducting pulse count and the recording density.

Prior to describing the operation of an embodiment of the invention shown in FIG. 1, the operating principle of a multi-gradation recording system of the invention will be described first with reference to FIGS. 5 and 6.

Figure 15:
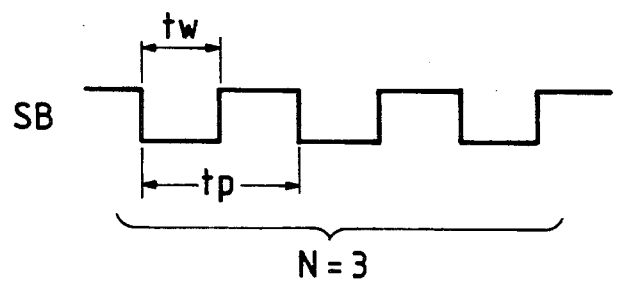
FIG. 15 is a diagram for a description of pulses in a conventional multi-gradation recording system.
Figure 16:
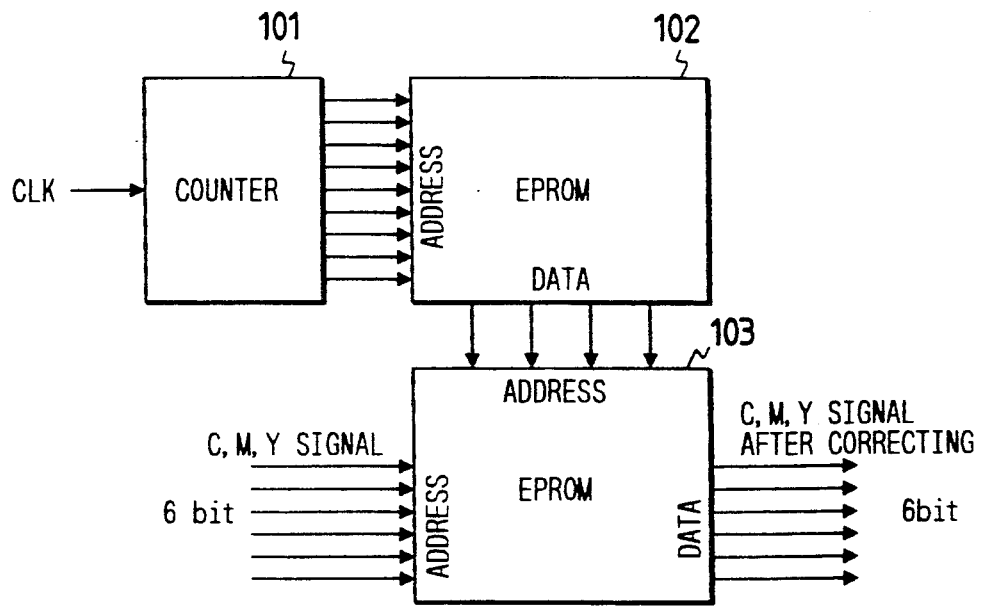
FIG. 16 is a diagram for a description of a conventional method of correcting resistance variations.
Figure 17:
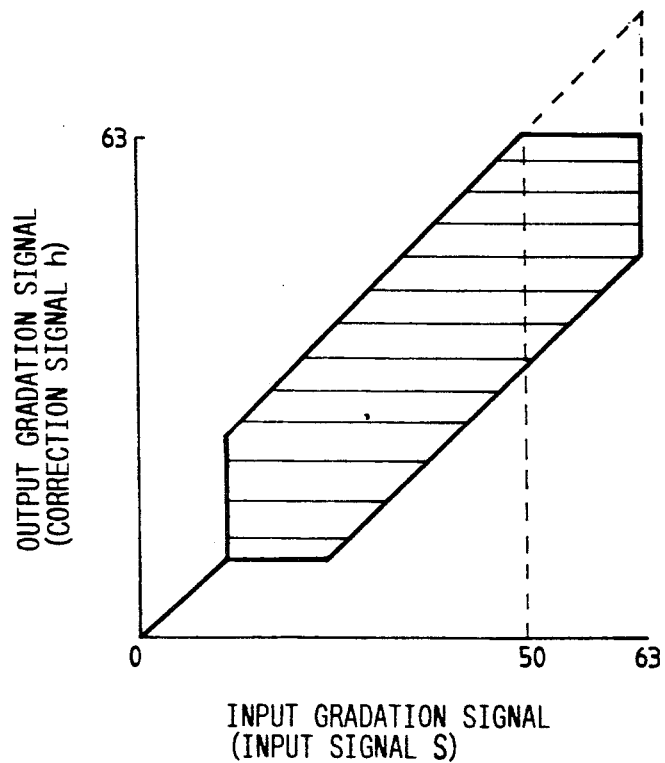
FIG. 17 is a diagram showing an exemplary conventional gradation correction.

In thermal transfer recording, conduction of several hundreds of nano second to several mili second is usually required to record 1-dot data. Here, pulse count control which is applicable to digital processing will be described. In the pulse count control, as previously shown in FIG. 15, when a pulse whose duration is several nsec (nano second) to several $\mu$sec (micro second) is applied to a heating resistor disposed on a thermal head 7 at a predetermined repetitive cycle $t_p$, its recording density gradually changes and depicts a loose curve as shown in FIG. 5. Thus, the recording density exhibits "compressed" changes in its relation with the changing conducting pulse count at both low and high gradation portions, while it exhibits a rapid change in intermediate gradation portion, thereby making it difficult to achieve faithful color reproduction.

Figure 6:
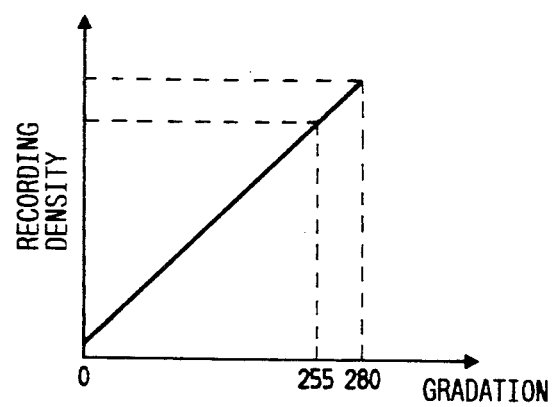
FIG. 6 is a diagram showing a correlation between the corrected gradation level and the recording density.
Figure 8:
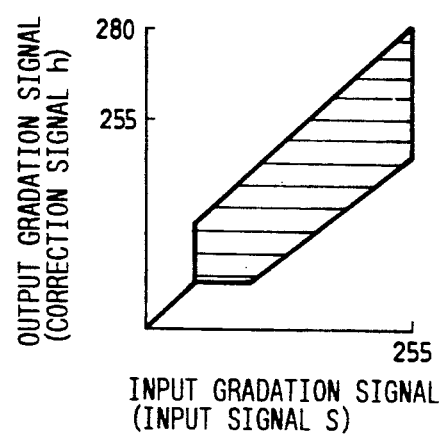
FIG. 8 is a diagram showing a correlation between the input signal and the corrected signal.

To overcome such a problem, a number of the pulse to be applied to the thermal head is increased at the high-density portion so that the recording density—gradation characteristic is controlled linearly as shown in FIG. 6.

In place of a conventional table of correspondence between the gradation level and the recording density prepared for 256-level recording so that recording of 0 to 255 gradation levels can be performed properly, a new correspondence table is prepared while reviewing changes in gradation level caused by the correction means 2. The new correspondence table allows, e.g., multi-gradation recording based on about 280 gradation levels out of its original multi-gradation recording based on 256 gradation levels.

Now, embodiments of the invention will be described with reference to the accompanying drawings. In FIG. 1, reference numeral 1 designates an input terminal to which an 8-bit gradation level signal S is applied; and 2, correction means for correcting differences in amount of heat due to, e.g., variations in the resistance of heating resistors disposed on the thermal head 7 or a like cause. Specifically, the correction means 2 produces a correction signal h by changing an input signal S in accordance with the variations or the like as shown in FIG. 7. In FIG. 1, reference numeral 3 designates recording line data, and 4, recording pixel position data. However, the recording line data 3 and the recording pixel position data 4 are not used in the first aspect of the invention. According to the first aspect of the invention, the correction signal h output from the correction means 2 is larger than input signal S. Particularly, the correction means 2 for correcting nonuniformity of the density according to the first aspect of the invention produces and outputs an (n+m)-level correction data h (e.g., 281 gradation levels in this embodiment) relative to an n-level input gradation level signal (e.g., 256 gradation levels in this embodiment) (S<h). Accordingly, the density nonuniformity at the high-density portion can be corrected, thereby allowing a generally high-quality image to be recorded.

However, the number of bits changes before and after the correction, specifically, from 8 bits to 9 bits, and such an increase in the number of bits aimed at image quality improvement causes the problems of not only complicating circuits but also reducing the recording speed. The complicating of the circuit is caused by that the storage means, such as a ROM, for processing based on 8-bit signal and the ICs, such as counter, constructed based on $2^n$ unit are require a circuit whose capacity is twice its present capacity, when the output signal increase only 1 bit from 8 bits to 9 bits. The reducing of the recording speed is caused by that the recording time period for one line becomes long due to increasing the number of the recording gradation. To overcome these problems, the second aspect of the invention, which attempts to reduce the number of bits in a signal while maintaining the high-quality recording performance, must be described here with reference to FIGS. 9A to 9C. In FIG. 9A, a normal 8-bit 256-gradation signal is corrected to, e.g., a 9-bit 281-gradation signal by the correction means 2 according to the first aspect of the invention.

Let the relation between the gradation level and the density be described here. Assuming that, e.g., white is 0 and the maximum density is 1, all densities exist between 0 and 1. When the scale of 281 gradation levels is specified, level 0 corresponds to density 0 and level 280 corresponds to density 1. When the scale of 71 gradation levels is specified, level 0 corresponds to density 0 and level 70 corresponds to density 1, which results in a coarse density resolution.

While each pixel is expressed in a 281-level fine gradation scale between white and the maximum density in FIG. 9A, each of four pixels is expressed in a 71-level coarse gradation scale between the same white and maximum density in FIG. 9B.

The second aspect of the invention attempts to replace a high density gradation with a coarse gradation with these four pixels as a group. If each of the four pixels is level 1 in FIG. 9A, then it is assumed that only a first odd pixel in an odd line has level 1 and that other pixels have level 0 in FIG. 9B. This rule will be shown in detail in FIG. 10A. As shown in FIG. 9C, let it be assumed that the four pixels before conversion are 272, 277, 278, 280. In such a case, they are expressed in terms of post-conversion coarse gradation as 68, 69, 69, 70.

This second aspect of the invention applies an integrating capacity to human vision, i.e., the capacity of seeing things as a group. More specifically, although a single pixel shown in FIG. 9A is usually laid out in a group of 6 to 12 within 1 mm, human eyes can only identify 3 to 4 pixels within 1 mm. Thus, the grouping of four pixels as shown in FIG. 9B does not affect image quality seen by the human eyes. It has been verified by experiments that a density variation in the gradation scale of FIG. 9B, in which four pixels are grouped and a set of gradation levels is assigned to every group of four pixels, can visually be identified as being similar to a gradual density variation shown by pixels in the gradation scale of FIG. 9A.

A system for achieving a high-quality image with a small number of bits by grouping a plurality of pixels will be described specifically with reference to FIGS.

10A and 10B. The positions of a plurality of k pixels (k is 4 in this example) are expressed by combination of an odd pixel (position A), an even pixel (position B), an odd line (position C), and an even line (position D). When pixels at positions A, B, C, D must be expressed in the fine gradation scale of 281 levels, the coarse gradation scale of 0 to 70 levels is specified based on the correspondence table shown in FIG. 10B. For example, when a pixel defined by an odd pixel and an odd line, i.e., a position A, is specified as level 277, then a level 70 is outputted. For a position B in the same input of level 277, level 69 is outputted. This conversion explains FIG. 9C.

Figures 10A, 10B:
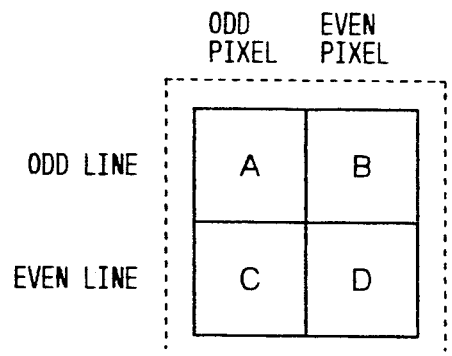
FIGS. 10A and 10B are diagrams for a description of a table which produces a converted gradation level output in which gradation levels of four pixels are reduced from their input corrected gradation levels.
Figure 11A:
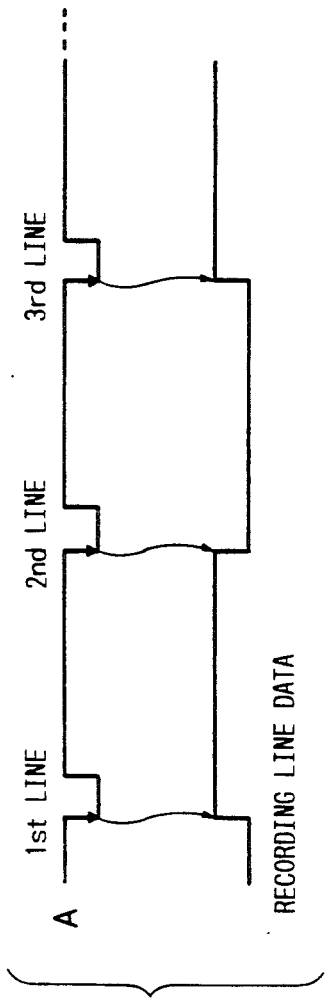
FIGS. 11A to 11C are diagrams for a description of both an instruction signal for selecting pixels as well as head variation correction data.
Figure 11B:
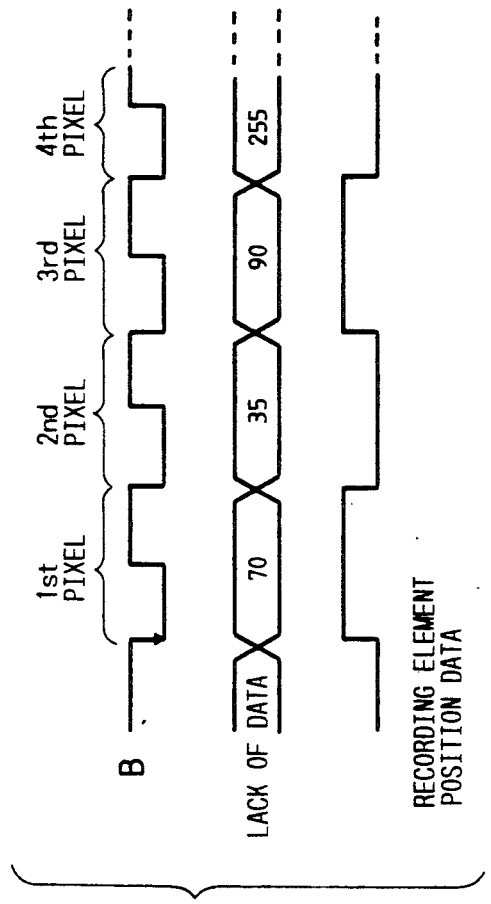
Figure 11C:
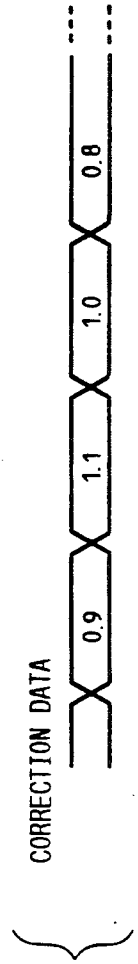

FIGS. 11A to 11C are signal diagrams for a description of this second aspect of the invention. In the second aspect of the invention, the correction means 2 shown in FIG. 1 includes the tables shown in FIGS. 7 and 10B, and selected signals shown in FIGS. 11A and 11B are applied to the correction means 2 to specify the positions of a plurality of pixels. Correction data shown in FIG. 11C which shows thermal head variations is also supplied to the correction means 2.

Returning to FIG. 1, the correction means 2 receives an input signal S, recording line data 3, recording pixel data 4, correction data 5 as described above, and a correction signal h which is smaller than the input signal S can be obtained as its output based on the tables shown in FIGS. 7 and 10B. The recording means 6, upon reception of such a correction signal h as an input, outputs a pulse count corresponding to each gradation level and controls the thermal head 7. The recording means 6 can record a maximum gradation level generated by the correction means 2 so that the 256-gradation level recording can be ensured properly. In this embodiment, the recording means 6 applies, e.g., a maximum of 70 conducting pulses, which is in correspondence with the 70-level gradation scale, to the thermal head 7. According to the above described embodiment, the correction signal output from the correction means 2 becomes seven bits signal.

Figure 12A:
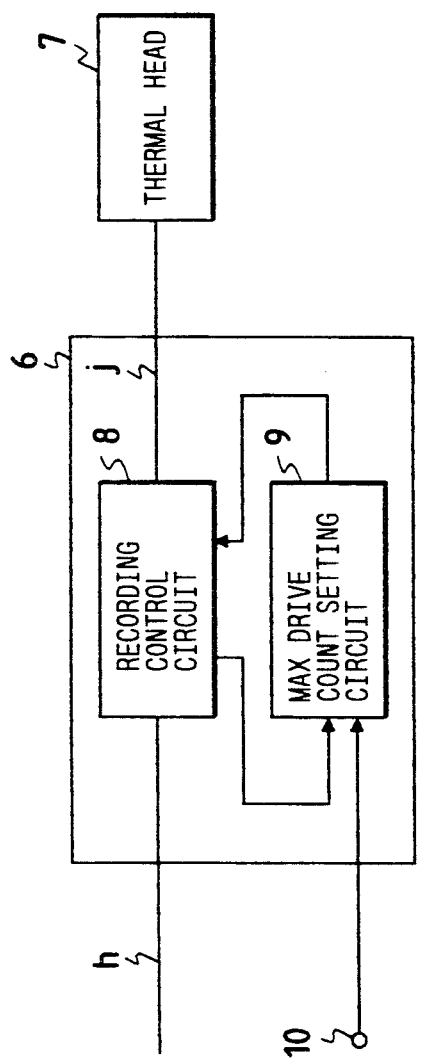
FIGS. 12A and 12B are a circuit diagram of a pulse count generating means and a diagram showing a conducting pulse signal.
Figure 12B:
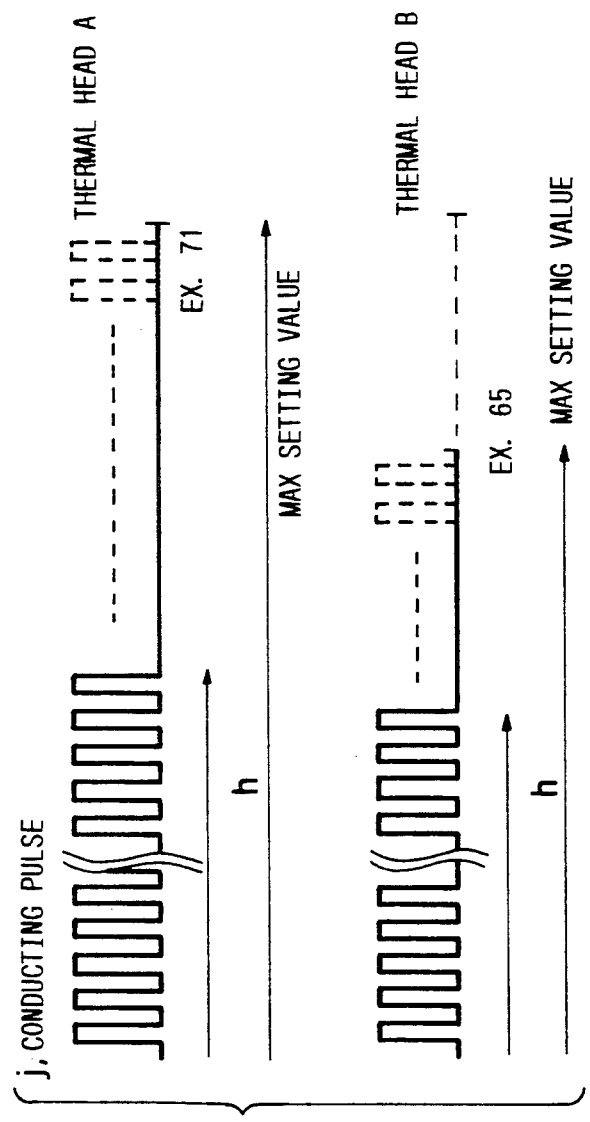

The third aspect of the invention will be described next. An exemplary circuit of the pulse count generating means 6 which applies drive signals j to the thermal head 7 in FIG. 1 as well as a conducting pulse signal as its output are shown in FIGS. 12A and 12B. In FIG. 12A, reference numeral 8 designates a recording control circuit, which transfers thermal head data and controls the conducting pulse count. Reference numeral 9 designates a maximum drive count setting circuit, which receives such a number of drive pulses as set by a set value signal 10 instructed by a microprocessor or the like. When the number of received pulses exceeds the set value, the maximum drive count setting circuit 9 is reset and starts counting the pulse for a next recording element of the thermal head 7.

In the above embodiment, to record a maximum of 71 gradation levels, a value of "71" is input as a set value signal 10 and this value "71" is set to the maximum drive count setting circuit 9.

In the above circuit 9, if an input corrected signal h is 71, a total of 71 conducting pulses j is applied to the thermal head 7. If h is 60, a total of 60 conducting pulses is applied thereto while the remaining 11 are left unapplied. (see FIG. 12B)

By the way, let it be assumed that the currently used thermal head is replaced with a less erratic thermal head with a post-correction maximum of 65 gradation levels. In such a case, the set value signal 10 remains fixed at level "71" in the conventional example, leaving the set value of the maximum drive count setting circuit as "71". In this case, an idle time equal to 5 pulse durations is produced during application of pulses to every recording element as shown in FIG. 12B.

The third aspect of the invention attempts to make the maximum drive count set by the maximum drive count setting circuit 9 of the pulse generating means 6 variable by changing the set value signal 10. In the above example, when the thermal head is replaced with one capable of recording at a maximum of 65 gradation levels, the value set by the maximum drive count setting circuit 9 is also changed to "65", so that, as shown in FIG. 12B, the conducting pulse control time to each recording element can be shortened compared with that in the conventional example.

Figure 2A:
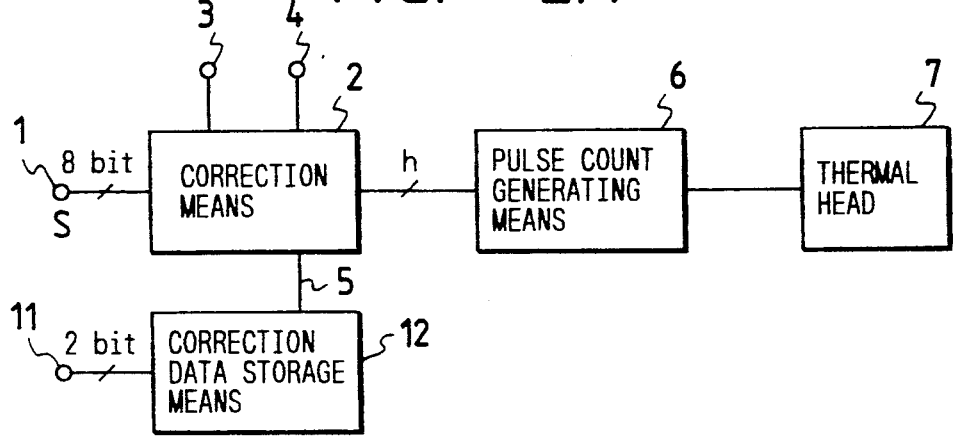
FIGS. 2A and 2B are block diagrams showing multi-gradation recording apparatuses, which are embodiments of a fourth aspect of the invention.
Figure 2B:
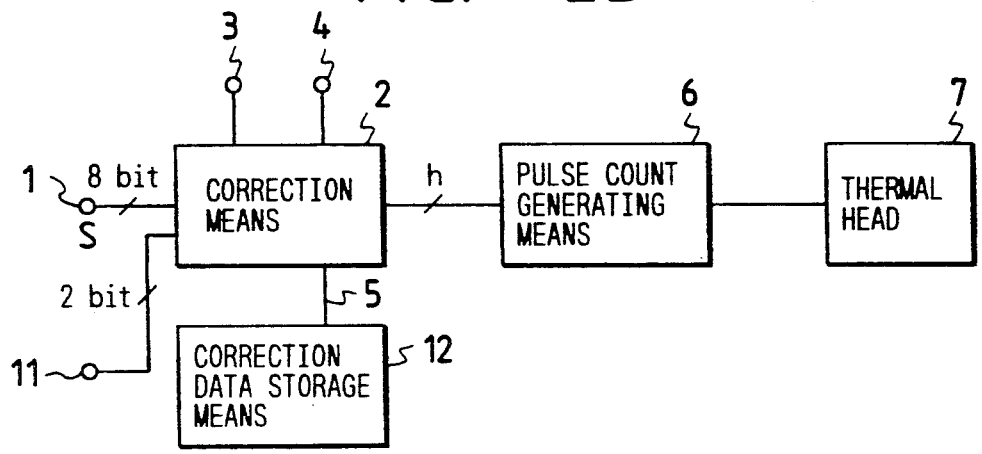
Figure 3A:
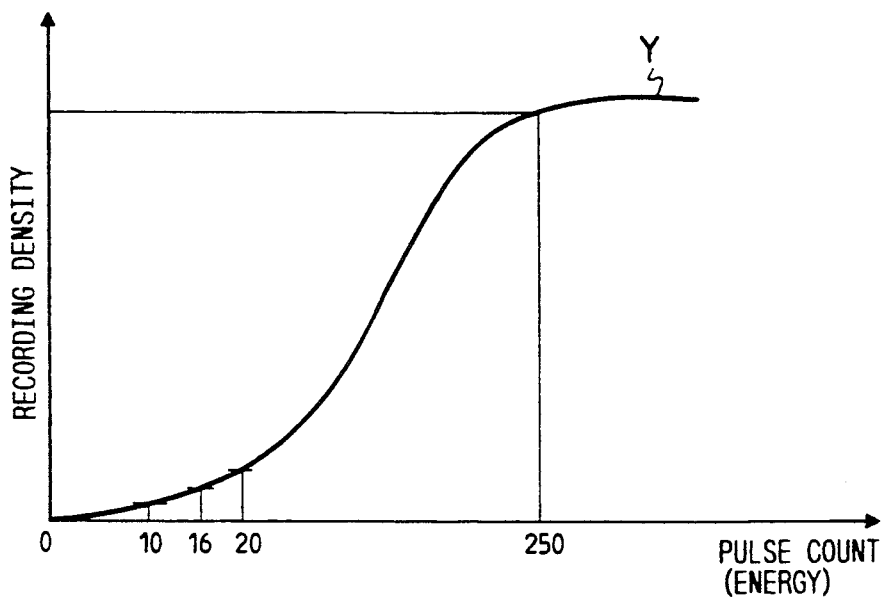
FIGS. 3A to 3D and FIG. 4 are diagrams for a description of the fourth aspect of the invention.
Figure 3B:
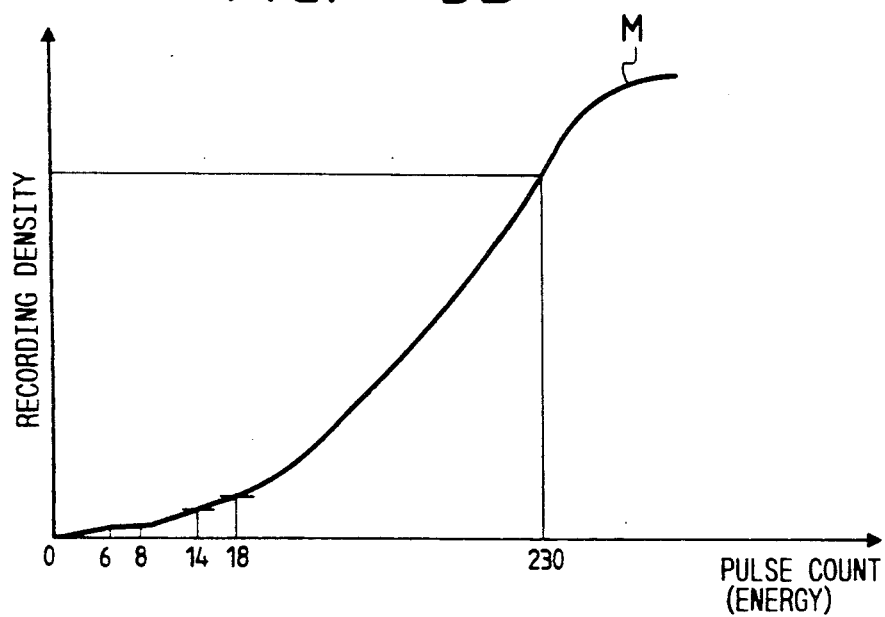
Figure 3C:
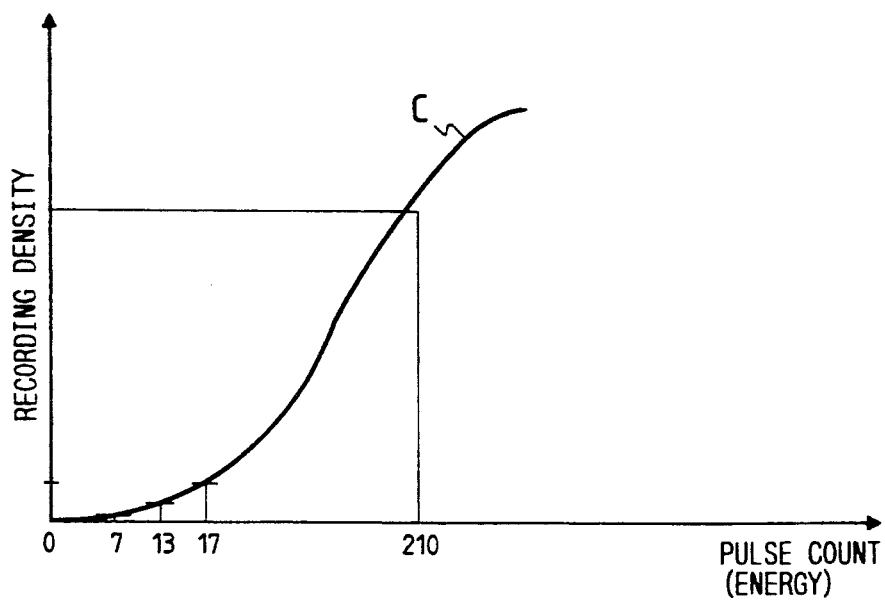
Figure 3D:
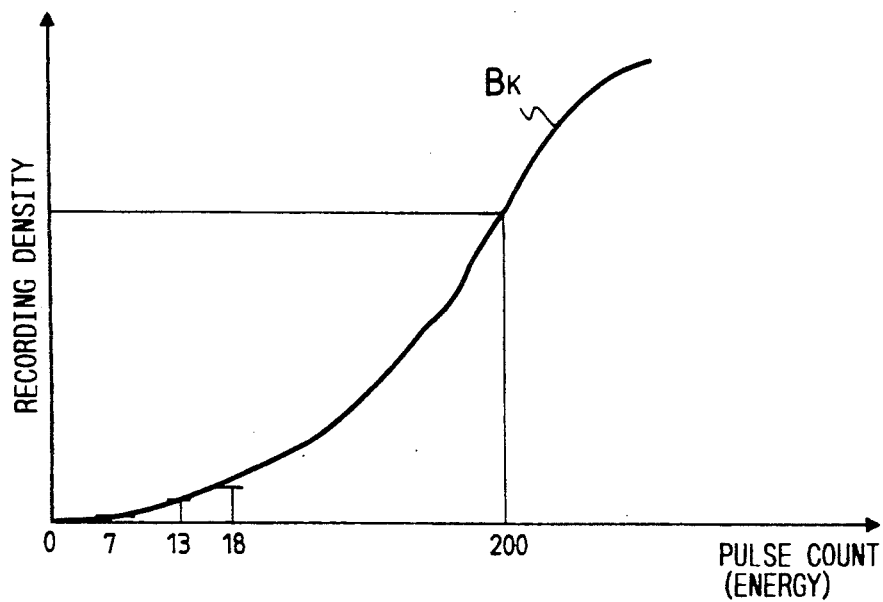
Figure 4:
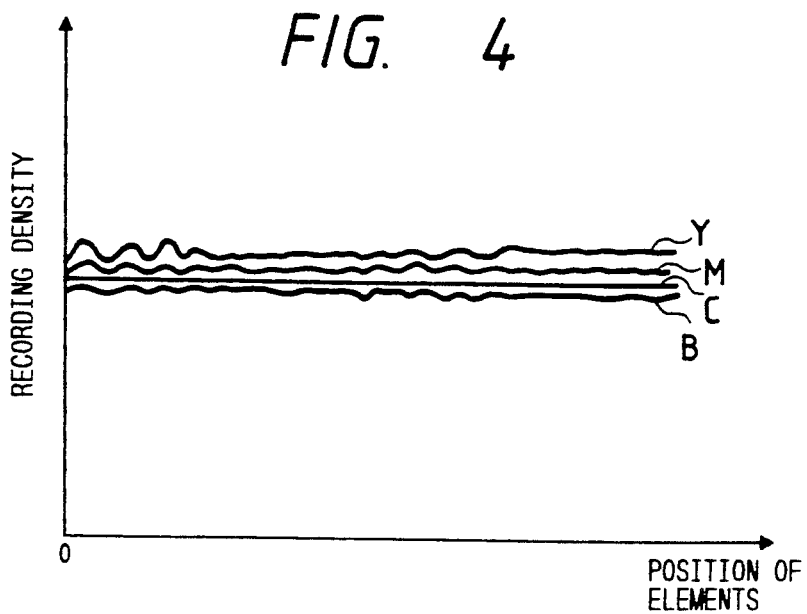

The fourth aspect of the invention attempts to convert an output signal on a color basis by adding a color signal 11 to the input of the correction means 2 or of the correction data storage means 12 as shown in FIGS. 2A and 2B. The color signal 11 consists of, e.g., 2 bits. Such binary inputs as "00" indicating a gradation level signal for Y; "01" indicating a gradation level signal for M; "10" indicating a gradation level signal for C; and "11" indicating a gradation level signal for Bk, if necessary, are input. The content of the color signal 11 is set by a not shown device control section or the like. Here, a case in which the color signal 11 is input to the correction data storage means 12 as shown in FIG. 2A indicates a method of preparing a correction constant corresponding to each heating resistor of the thermal head 7 considering energy which is different among colors as shown in FIG. 13. A case in which the color signal 11 is inputted to the correction means 2 as shown in FIG. 2B indicates a method of converting an output signal on a color basis in correspondence with a correction constant. Specifically, a table similar to that shown in FIG. 7 is prepared for each recording color. The table values in both cases shown in FIGS. 2A and 2B can be defined by calculating data such as resistance measurements and a relation between the color-specific gradation level and the recording density or by reading a recorded sample of each color with a reading device.

Applications of these aspects of the invention are not limited to the above embodiments, but they may be modified in various ways. For example, while signal levels are converted by the density nonuniformity correction means 2 in the above embodiments, the invention may be applied to cases where other correction means such as temperature control correction means, voltage drop control correction means, or the like are employed to correct input signals, with the same effects as the above embodiments.

In addition, while the case of the 70-gradation level recording with an 8-bit input signal corrected to a 7-bit signal has been described in the second aspect of the invention, the application of the invention is not limited thereto. In the first aspect of the invention, the number of bits in the input signal, the number of bits in the corrected signal are not limited to the above-described values, but may be any value as long as the relationship S<h is satisfied.

Further, while the thermal transfer recording is taken as an example in the above embodiments, the system according to the invention may similarly be applied to any recording system such as a xerographic system, a thermal recording system, or an ink jet recording system, providing the same effects as the above embodiments.

Figure 14A:
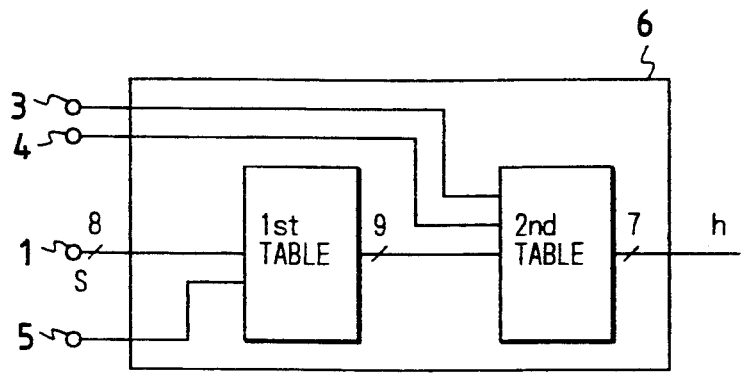
FIGS. 14A and 14B are diagrams showing another embodiment of the invention.
Figure 14B:
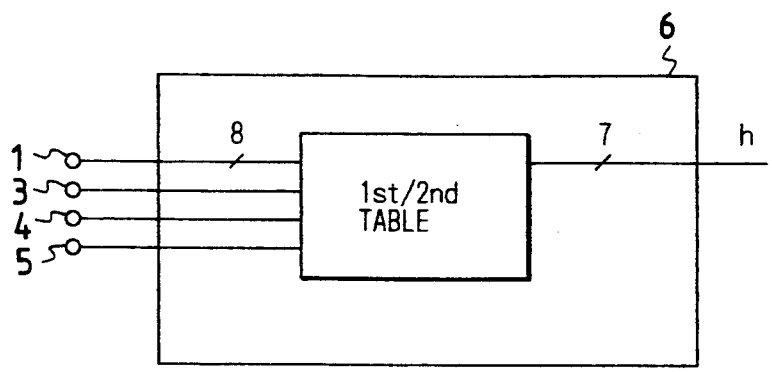

Further, as shown in FIG. 14A, the correction means 2 internally processes the data in the order of the first table shown in FIG. 7 and the second table shown in FIG. 10B in the embodiments of the second aspect of the invention. However, if these two tables shown in FIGS. 7 and 10B are merged into one table as shown in FIG. 14B, the same effects as those in the above embodiments may be obtained as long as the correction signal h is smaller than the input signal S. In addition, the tables used in the above embodiments may be replaced by microprocessor operations, which allows the same effects to be provided.

While a plurality of pixels, or specifically four pixels, are taken as a group in the above embodiments, the number of pixels is not limited to 4, but may be an arbitrary value such as 6, 8, 16, or the like. In such a case, the numbers of bits constituting the recording line data 3 and the recording pixel position data 4 inputted to the correction means 2 are also changed, and if six pixels are taken as a group, the recording line data 3 may consist of 2 bits and the recording pixel position data 4 may consist of 1 bit or vice versa. If only two pixels are taken as a group, either the recording line data 3 or the recording pixel position data 4 may be applied to the correction means 2. In either case, no limits are imposed on the number of bits.

While the set value signal 10 is instructed from the microprocessor or the like in the third aspect of the invention, such instruction may also originate from an operation panel or the like. The application of the invention is not limited thereto. The invention may be modified in many ways as the case may require. The maximum drive count setting circuit 9 may be made of a counter or the like. In such a ID case, the number of gradation levels per line may be limited by incrementing or decrementing the set value signal 10 in accordance with the number of conducting pulses applied from the recording control circuit 8 and outputting a stop signal may when the set value signal 10 reaches a predetermined value. Similarly, no limits are imposed on its construction.

Although the color signal 11 to be fed to the correction means 2 or the correction data storage means 12 consists of 2 bits in the fourth aspect of the invention, the application of the invention is not limited thereto. For example, a 3-bit or 4-bit input for each color may provide the same effects. In addition, even if the color signal 11 is applied to both the correction means 2 and the correction data storage means 12, which seems to be a construction in which FIGS. 2A and 2B are combined together, such construction may provide the same effects.

Moreover, the first, second, third, and fourth aspects of the invention may be combined together, whenever necessary. For example, if the second, third, and fourth aspects of the invention are combined together, the advantage of achieving high-speed and high-quality recording may be provided.

As described in the foregoing, the first aspect of the invention subjects an n-level input to m-level correction even at a high-density side, thereby allowing high-quality multi-gradation recording to be performed.

The second aspect of the invention reduces the number of gradation levels by combining the position signals of a plurality of pixels with corrected (n+m)-level signals to be applied to the respective recording elements, thereby allowing high-quality multi-gradation recording to be performed with comparatively simple circuits at high speeds.

The third aspect of the invention sets the sufficient maximum drive count in accordance with a replaced recording element, thereby allowing idle conducting control time to be saved and providing the advantage of shortening the recording time.

The fourth aspect of the invention corrects density nonuniformity on a color basis, thereby allowing nonuniform densities differing from one color to another to be eliminated and providing the advantage of high-quality recording.

What is claimed is:

1. A multi-gradation recording apparatus for producing high-quality multi-gradation images, comprising:
   recording means for recording the multi-gradation images, said recording means having a plurality of recording elements;
   correction means for correcting an input gradation signal having predetermined n gradation levels in response to correction data with reference to a first data table in order to compensate differences of characteristics of each of said recording elements, said first data table representing a correspondence among the input gradation signal, the correction data and a corrected gradation data signal having (n+m) gradation levels and which is larger than the input gradation signal;
   pulse count generating means for applying drive pulses to said recording means based on an output signal of said correction means.

2. The apparatus as claimed in claim 1, wherein said correction means compresses said corrected gradation data signal into a coarse gradation data signal according to a second data table, said second data table representing a correspondence among said corrected gradation data signal, a set of recording pixel position data, and the coarse gradation data signal.

3. The apparatus as claimed in claim 2 further comprising correction data storage means for receiving color signals having a 2 bits, said correction data storage means having third data table of correction data for each color.

4. The apparatus as claimed in claim 2, wherein said correction means are provided for Yellow signals, Magenta signals, Cyan signals, and Black signals, respectively.

5. The apparatus as claimed in claim 1, wherein said pulse count generating means comprises recording control means for transferring said drive pulses to the recording means and for controlling number of the drive pulses, and maximum drive count setting means for setting a maximum drive pulse count according to a set value instruction from a microprocessor, said maximum drive pulse count being changeable.

6. The apparatus as claimed in claim 5, wherein said maximum drive count setting means receives a number of drive pulses until exceeding said maximum drive pulse count, and when the number of received pulses exceeds the maximum drive pulse count said maximum drive count setting means resets and restarts to count said driving pulses for a next recording element.

7. The apparatus as claimed in claim 5 further comprising correction data storage means for receiving color signals having a 2 bits, said correction data storage means having third data table of correction data for each color.

8. The apparatus as claimed in claim 5, wherein said correction means are provided for Yellow signals, Magenta signals, Cyan signals, and Black signals, respectively.

9. The apparatus as claimed in claim 1 further comprising correction data storage means for receiving color signals having 2 bits, said correction data storage means having a third data table of correction data for each color.

10. The apparatus as claimed in claim 1, wherein said correction means are provided for Yellow signals, Magenta signals, Cyan signals, and Black signals, respectively.

* * * * *